(12) United States Patent
Carrejo et al.

(10) Patent No.: US 9,238,316 B2
(45) Date of Patent: Jan. 19, 2016

(54) METHOD OF MAKING AN ANISOTROPIC FILTRATION MEDIA

(75) Inventors: Nicholas Carrejo, Katy, TX (US); Michael H. Johnson, Katy, TX (US); Randall V. Guest, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 456 days.

(21) Appl. No.: 13/596,686

(22) Filed: Aug. 28, 2012

(65) Prior Publication Data

US 2012/0319317 A1  Dec. 20, 2012

Related U.S. Application Data

(62) Division of application No. 12/894,957, filed on Sep. 30, 2010, now Pat. No. 8,517,184.

(51) Int. Cl.
*B29C 61/00* (2006.01)
*B29C 44/56* (2006.01)

(52) U.S. Cl.
CPC ......... *B29C 44/5663* (2013.01); *B01D 2239/10* (2013.01)

(58) Field of Classification Search
CPC ............................ B29C 44/5627; B29C 44/02
USPC ............................................... 264/48; 55/522
See application file for complete search history.

(56) References Cited

U.S. PATENT DOCUMENTS

| 3,475,525 A | 10/1969 | Peters |
| 3,476,933 A | 11/1969 | Mendelsohn |
| 3,523,996 A | 8/1970 | Kordiak |
| 3,873,281 A | 3/1975 | Himes et al. |
| 4,167,612 A * | 9/1979 | Tucker et al. ................ 521/110 |
| 4,285,893 A | 8/1981 | Contastin |
| 4,454,248 A * | 6/1984 | Pollock et al. ................ 521/53 |
| 4,579,700 A | 4/1986 | Cavender |
| 4,624,784 A | 11/1986 | Jeong |
| 4,751,253 A | 6/1988 | Tylenda |
| 4,863,976 A | 9/1989 | Nichols et al. |
| 5,614,566 A | 3/1997 | Burkhart et al. |
| 6,080,800 A | 6/2000 | Frey et al. |
| 6,090,479 A | 7/2000 | Shirato et al. |
| 6,093,752 A | 7/2000 | Park et al. |
| 6,472,449 B1 | 10/2002 | Heinemann et al. |
| 2007/0213417 A1 | 9/2007 | Stork et al. |
| 2010/0176542 A1 | 7/2010 | Juma |

FOREIGN PATENT DOCUMENTS

| CN | 101597177 A | 12/2009 |
| WO | WO 2007052054 A1 * | 5/2007 |
| WO | WO2009142389 A1 | 11/2009 |

OTHER PUBLICATIONS

Notification of Transmittal of the International Search Report and the Written Opinion of the International Searching Authority; PCT/US2011/053964; mailed Apr. 25, 2012; 9 pages.

* cited by examiner

*Primary Examiner* — Galen Hauth
(74) *Attorney, Agent, or Firm* — Cantor Colburn LLP

(57) ABSTRACT

A method of making an anisotropic filtration media includes foaming a media, straining the media in a selected direction, and relieving strain of the media in the selected direction.

7 Claims, 3 Drawing Sheets

METHOD OF MAKING AN ANISOTROPIC FILTRATION MEDIA

CROSS-REFERENCE TO RELATED APPLICATION

This application is a divisonal application of U.S. patent application Ser. No. 12/894,657, filed Sep. 30, 2010, the entire contents of which are incorporated herein by reference.

BACKGROUND

Filtration media that have anisotropic flow and filtration characteristics typically vary these characteristics in the direction of fluid flow. For example, the sizes of particles filtered out by a typical anisotropic filtration media decreases in the direction of fluid flow through the media. Some applications, however, may benefit from an anisotropic filtration media that differs in directions other than that of the fluid flow. New anisotropic filtration media and methods for making such media would therefore be well received in the art.

BRIEF DESCRIPTION

Disclosed herein is a method of making an anisotropic filtration media. The method includes, foaming a media, straining the media in a selected direction, and relieving strain of the media in the selected direction.

Further disclosed herein is an anisotropic filtration media. The anisotropic filtration media includes, a body having a foamed structure, and a plurality of cell walls separating a plurality of cavities defining the foamed structure, and a plurality of the plurality of cell walls oriented near parallel to a selected direction having a greater percentage of openings ruptured therein by straining of the body than a plurality of the plurality of cell walls oriented further from parallel to the selected direction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
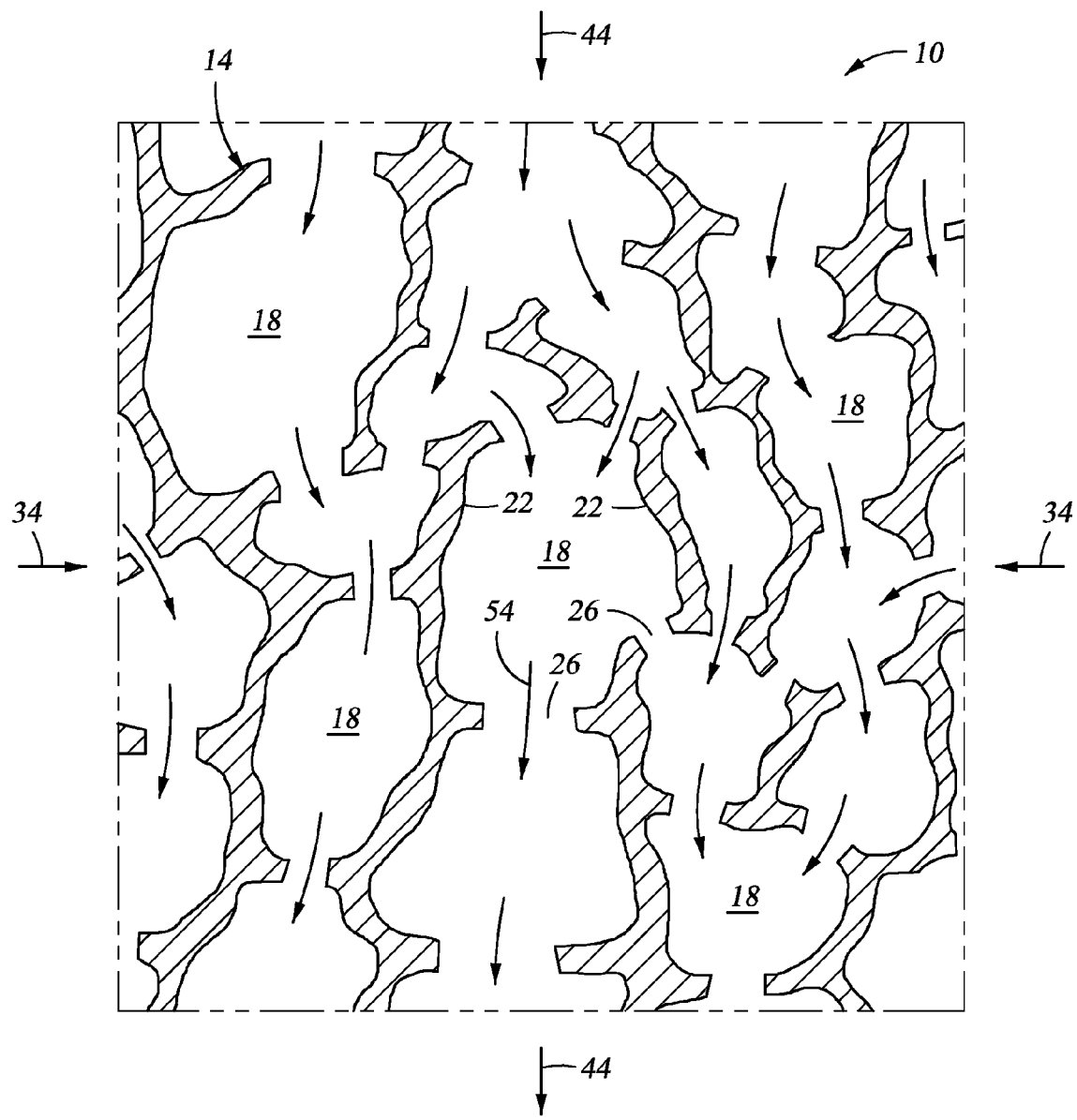
FIG. 1 depicts a partial cross sectional view of an anisotropic filtration media disclosed herein.

Referring to FIG. 1 an anisotropic filtration media disclosed herein is illustrated at 10. The anisotropic filtration media 10 includes, a body 14 having a foamed structure defined by a plurality cavities 18 with cell walls 22 surrounding each of the cavities 18. Some of the cell walls 22 have openings 26 therethrough that fluidically connect the cavities 18 that are adjacent to the cell walls 22 having the openings 26. The openings 26 are not distributed evenly through the body 14 but instead are distributed such that more of them are located on the cell walls 22 that are oriented nearer to parallel to a first direction, as indicated by the arrows 34, than are oriented further from parallel to the first direction. This non-symmetrical distribution of openings 26 in the media 10 causes the media 10 to be anisotropic. The anisotropic nature of the media 10 results in greater restriction of fluid flow in directions parallel to the arrows 34 and less restriction to fluid flowing in directions orthogonal to the arrows 34.

Figure 2:
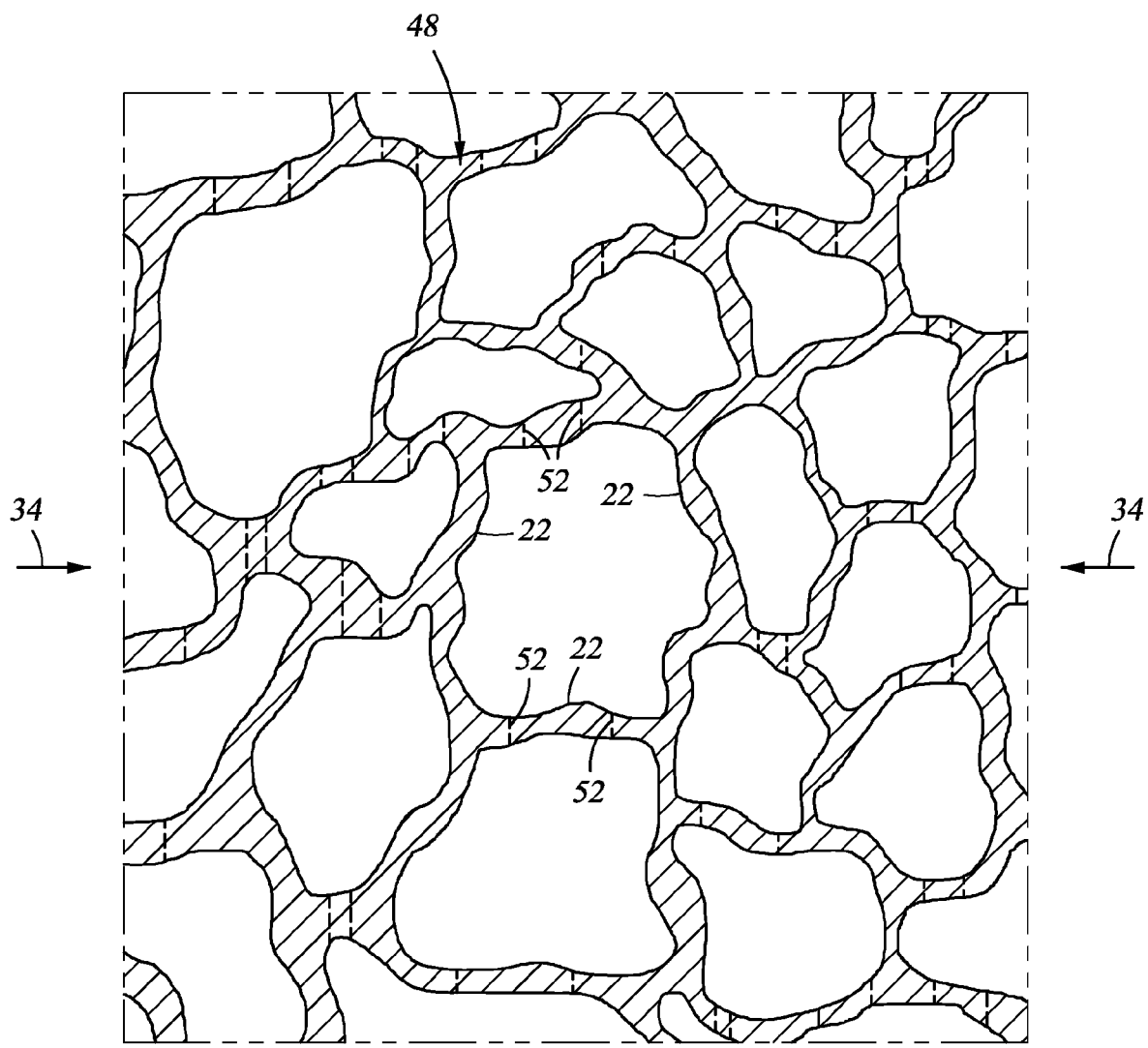
FIG. 2 depicts a partial cross sectional view of an isotropic media used in the production of the anisotropic filtration media of FIG. 1.

Referring to FIG. 2, the anisotropic structure of the media 10 is created from a body 48 that, as illustrated here, is an isotropic structure in the as-foamed condition. Most, and possibly all, of the cell walls 22 of the body 48 are free of any of the openings 26 (only in FIG. 1). The openings 26 are formed in the cell walls 22 in response to the body 48 undergoing mechanical straining. One strain that will make tears in the cell walls is a compressive strain, or compaction, that causes buckles as described below. Another is a shear strain (that is equivalent to a superimposed tension and compression along mutually orthogonal axes oriented ±45° from the shearing direction). This also causes buckles in the cell walls 22. Tension may also be used to preferentially open cell walls 22 by simple tearing. In the illustrated embodiment the compaction is in the direction of arrows 34. This compaction causes the cell walls 22 that are aligned more parallel to the arrows 34 to buckle, thereby stressing the material of the cell walls 22 resulting in tearing and generation of the openings 26 therethrough. Dashed lines 52 in the cell walls 22 highlight the cell walls 22 that are aligned near enough to parallel with the arrows 34 for tearing to occur thereto. It is these cell walls 22, as shown in FIG. 1, that have openings 26 therein. In contrast, the cell walls 22 without the dashed lines 52 happen to be aligned in orientations further from parallel with the arrows 34 and, as such, do not buckle under the compaction and consequently do not tear to form the openings 26. Optionally, a structure (not shown) may be employed to support the body 48 to thereby prevent it from expanding in directions orthogonal to the arrows 34 while the compaction is taking place. Such support can minimize or prevent buckling of the body 48 itself to thereby prevent undesirable localized tearing in some of the cell walls 22. After the mechanical compaction is removed the body 14 returns dimensionally toward the dimensions of the body 48. Exact dimensional recovery to the original, pre-compaction dimensions, however, is not needed. For example, the recovery may be to a dimension less than, greater than or roughly equal to the original dimension. If, for instance, the foam dimension has been reduced by lower pressure inside the cavities 18 compared to ambient pressure, the recovered dimension may be greater than the initial dimension.

Referring again to FIG. 1, since the majority of the openings 26 are in the cell walls 22 aligned nearer to parallel to the arrows 34 it can be observed that fluid flow through the body 14 will have less restriction in directions orthogonal to the arrows 34 than in the direction of the arrows 34. Arrows 54 show possible fluid flow paths through the cavities 18 and the openings 26 for fluid flowing generally in the direction of arrows 44. Restriction to flow is determined, in part, by sizes of the openings 26. The sizes of the openings 26 also determine the filtration characteristics of the completed media 10. Although the number of, and sizes of the openings 26 are somewhat random they depend upon parameters of the foamed body 48 including, material, percent solid, the size of the cavities 18, percentage of compaction employed, and a temperature at which the compaction takes place, for example. For example, compaction at room temperature may result in either larger or smaller sized openings 26, and more or fewer openings 26 than compaction at an elevated temperature. An operator, therefore, through control of at least the foregoing parameters, can control the filtration characteristics through the anisotropic filtration media 10.

Figure 3:
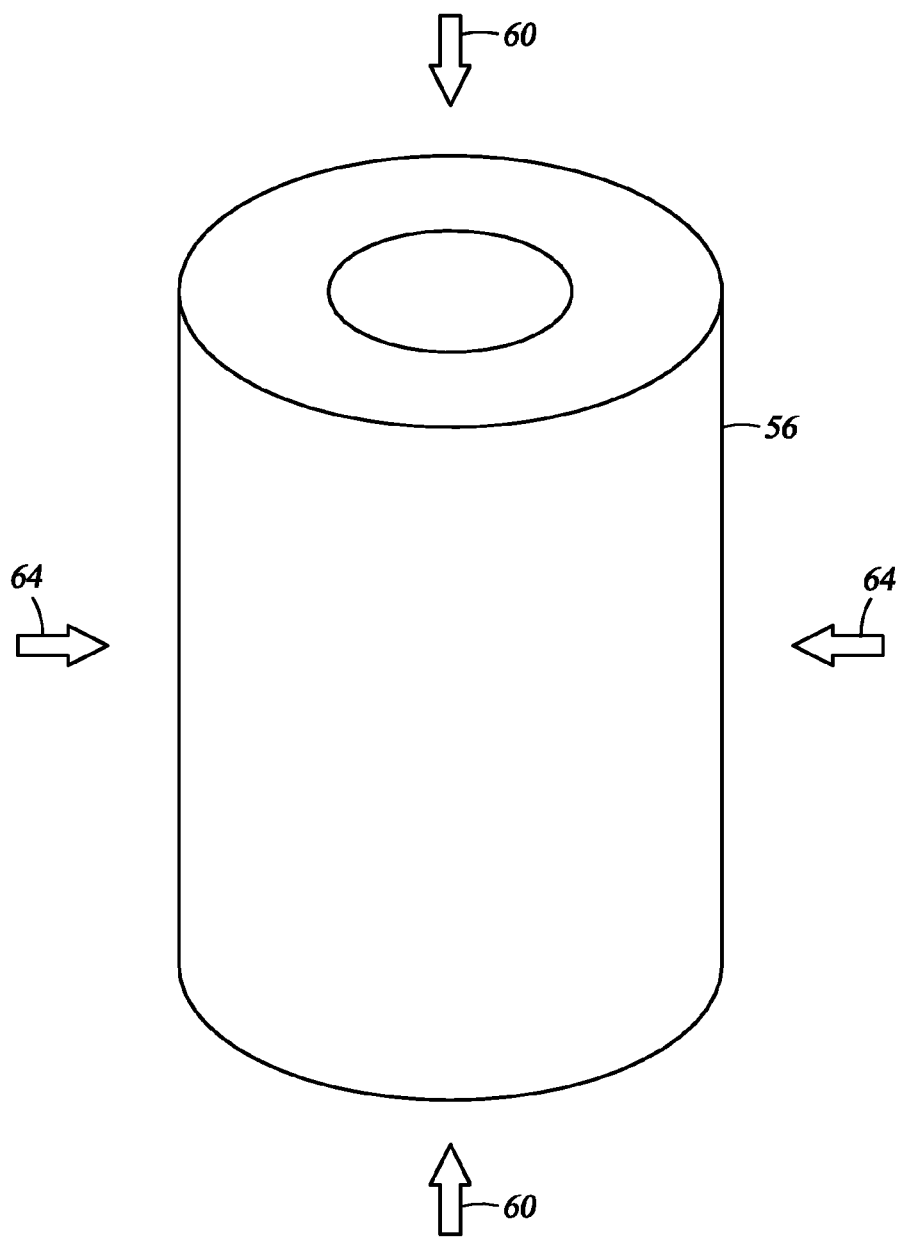
FIG. 3 depicts a tubular screen constructed of the anisotropic filtration media of FIG. 1.

Referring to FIG. 3, an embodiment of a screen 56 constructed of the anisotropic filtration media 10 is illustrated. The screen 56 has a tubular shape and has been compacted in a longitudinal direction along arrows 60. The finished screen 56 therefore has anisotropic flow and filtering characteristics. Flow through the screen 56, for example, is less restrictive in a radial direction, along arrows 64, than it is in a longitudinal direction, along arrows 60. Similarly, the filtration characteristics differ between these two directions as well. Such anisotropic characteristics may be desirable for certain applications. For example, the screen 56 could be employed in earth formation borehole applications concerned with hydrocarbon recovery or carbon sequestration. The screen 56 could be attached around a perforated pipe (not shown) and installed in a wellbore to filter fluid flowing therethrough in either radial direction. In a hydrocarbon recovery application the screen 56 can be employed to filter out sand and gravel particles to reduce erosion of downstream components and to help maintain the structure of the formation. The screen could also be configured to expand radially after positioning within the borehole to provide even greater support to the formation. Additionally, the longitudinal restriction to flow through the screen 56 can help isolate flow from one portion of the formation from that of another portion of the formation displaced longitudinally along the borehole, for example, such as between a highly permeable portion and a less permeable portion.

Radial expansion of the screen 56 could result from material selection of the media (i.e. from an expandable material), or from radial compaction of the screen 56 prior to miming into the borehole, or combinations of both. Employable materials include, elastomers/polymers, metals, glass and combinations of the foregoing, for example.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of making an anisotropic filtration media, comprising:
   foaming a media into a tubular shape;
   straining the media in a longitudinal direction of the tubular shape;
   relieving strain of the media in the longitudinal direction;
   forming a higher percentage of openings in cell walls of the media that are nearer to parallel to the longitudinal direction than to those further from parallel to the longitudinal direction; and
   attaching the media around a perforated pipe.

2. The method of making an anisotropic filtration media of claim 1, further comprising supporting the anisotropic filtration media in all directions orthogonal to the selected direction during the straining.

3. The method of making an anisotropic filtration media of claim 1, wherein the straining is performed at room temperature.

4. The method of making an anisotropic filtration media of claim 1, wherein the straining is performed at other than room temperature.

5. The method of making an anisotropic filtration media of claim 1, wherein the media is configured to expand radially outwardly after having been attached around the perforated pipe.

6. The method of making an anisotropic filtration media of claim 1, wherein the straining is compressive strain.

7. The method of making an anisotropic filtration media of claim 1, further comprising compacting the media radially after having been attached around the perforated pipe.

* * * * *